H. H. BOCKELMAN.
BAND CUTTER AND FEEDER.
APPLICATION FILED MAR. 21, 1908.
901,674.
Patented Oct. 20, 1908.
3 SHEETS—SHEET 1.
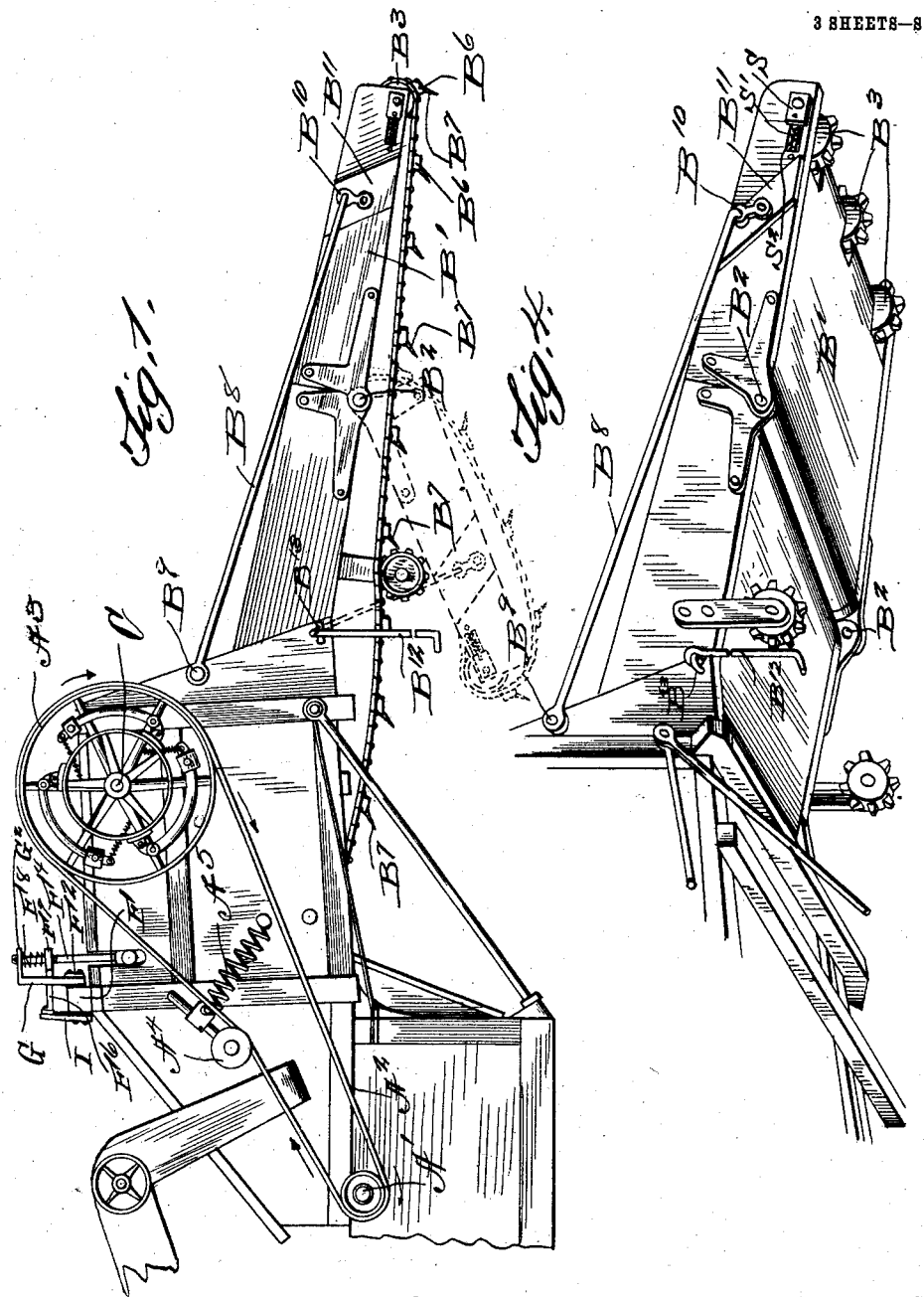
Witnesses
Inventor
H. H. Bockelman,
By Franklin N. Hough
Attorney

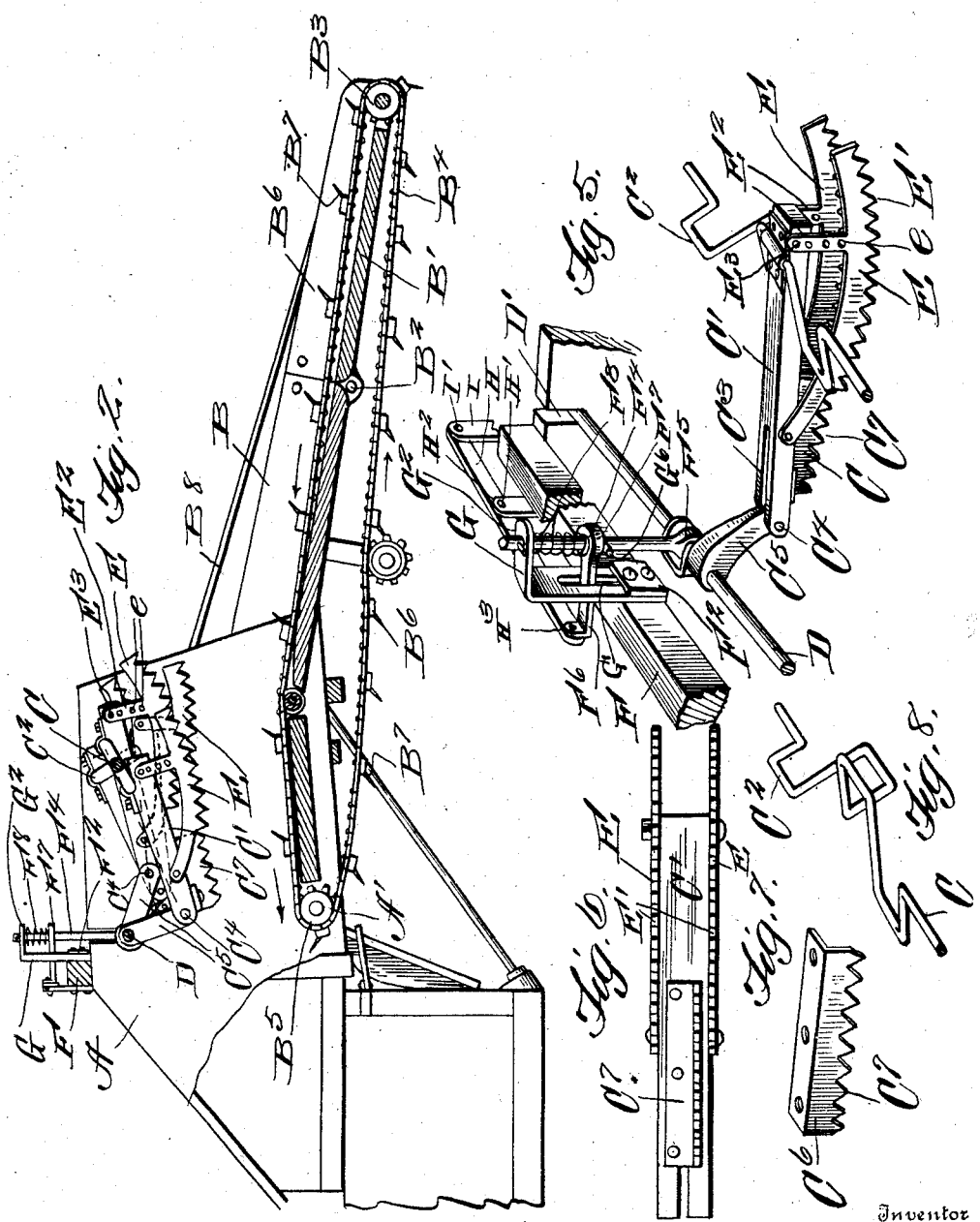

H. H. BOCKELMAN.
BAND CUTTER AND FEEDER.
APPLICATION FILED MAR. 21, 1908.
901,674.
Patented Oct. 20, 1908.
3 SHEETS—SHEET 3.
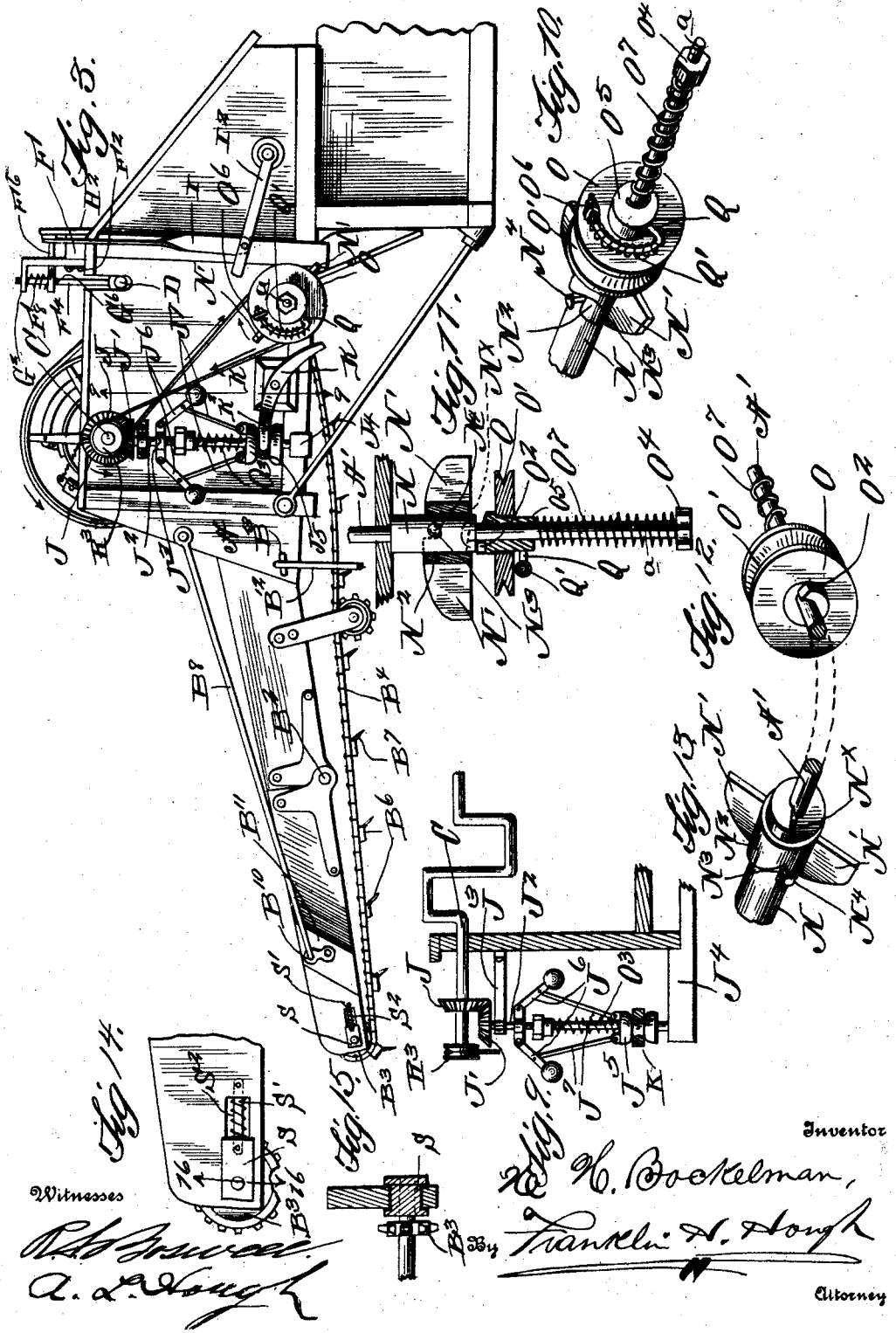
Witnesses
Inventor
H. H. Bockelman,
By Franklin N. Hough
Attorney

UNITED STATES PATENT OFFICE.

HENRY H. BOCKELMAN, OF SYLVAN GROVE, KANSAS.

BAND-CUTTER AND FEEDER.

No. 901,674.  Specification of Letters Patent.  Patented Oct. 20, 1908.

Application filed March 21, 1908. Serial No. 422,531.

To all whom it may concern:

Be it known that I, HENRY H. BOCKELMAN, a citizen of the United States, residing at Sylvan Grove, in the county of Lincoln and State of Kansas, have invented certain new and useful Improvements in Band-Cutters and Feeders; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in feeding apparatus for threshing machines, and comprises various details of construction, combinations and arrangements of parts whereby the straw may be automatically fed to the cylinder of the machine.

The invention is illustrated in the accompanying drawings, in which:—

Figure 1 is a view in elevation of one side of the feeding apparatus. Fig. 2 is a longitudinal section through the feeding apparatus, parts being shown in elevation. Fig. 3 is a view in elevation of the side opposite to the one illustrated in Fig. 1. Fig. 4 is a detail perspective view of the extension frame upon which the conveyers are mounted. Fig. 5 is a detail perspective view showing the manner of adjustment of feeding segments. Fig. 6 is a sectional view through one of the arms carrying the feeding segments. Fig. 7 is a detail view of a toothed segment plate shown in edge view in Fig. 6. Fig. 8 is a detail view in perspective of a crank shaft upon which the segment carrying plates are mounted. Fig. 9 is a sectional view on line 9—9 of Fig. 3. Fig. 10 is a detail perspective view of a clutch and pulley wheel mounted upon the conveyer driving shaft. Fig. 11 is a sectional view through the mechanism shown in Fig. 10. Fig. 12 is a detail view showing a pulley having a clutch tooth upon the end thereof. Fig. 13 is a detail view of a winged collar splined to the conveyer driving shaft. Fig. 14 is a detail view showing the means for taking up slack in the conveyer, and Fig. 15 is a sectional view on line 16—16 of Fig. 15.

Reference now being had to the details of the drawings by letter, A designates the casing of the feeding apparatus which is a part of a threshing machine, and A' designates a threshing cylinder shaft which is designed to be continuously driven by any suitable power and upon which shaft the threshing cylinder (not shown) is designed to be mounted. In Fig. 1 of the drawings, the shaft A' is shown as having a belted connection $A^2$ with a driving wheel $A^3$, a suitable belt tightening pulley $A^4$ bearing against said belt yieldingly by means of a spring $A^5$ secured to the side of the frame of the apparatus.

Projecting from the casing or frame is an extension conveyer trough B, to which an extension section B' is hinged as at $B^2$, shown clearly in Figs. 2 and 3 of the drawings. Mounted adjacent to the free end of the extension B' are sprocket wheels $B^3$, over which an endless conveyer $B^4$ travels, which latter also passes about sprocket wheels $B^5$ fixed to the shaft $a$. Said conveyer $B^4$ is provided with suitable cross cleats $B^6$, having spurs $B^7$ thereon for the purpose of engaging grain and causing the same to be fed forward by the carrier. In order to hold the section B' in alinement with the extension B when in use, rods $B^8$ are provided which are pivotally connected at $B^9$, as shown in Fig. 1 of the drawings, upon opposite sides of the frame and each rod has a hooked end engaging an eye $B^{10}$ projecting from a plate $B^{11}$ upon said section B', as shown in Figs. 1 and 4 of the drawings. When the section B' is folded, a hook $B^{12}$, which is pivotally mounted upon an eye $B^{13}$, shown in Fig. 1, is provided which is adapted to hold the section when turned back connected with the extension of the frame, as shown in dotted lines in Fig. 1.

Mounted in suitable bearings in the opposite walls of the casing is a crank shaft C upon which the driving pulley $A^3$ is mounted and C' designates pitmen, each of which has pivotal connection with a crank $C^2$ upon the shaft C and each of said pitmen C' has a slotted end $C^3$ to receive a pin $C^4$, to which a link $C^5$ is pivoted, said link being fixed to a shaft D, which latter is loosely mounted in slots D' in the walls of the casing, one end of the shaft being shown thus mounted in Fig. 5 of the drawings. By this manner of mounting the shaft D, it will be noted that the latter is adapted to have a vertical movement when held in a horizontal position. Each of the several pitmen C' is similarly connected to a link C⁵ upon the shaft D and at its opposite end connected to a crank C². Fixed to the under side of each pitman C' is an angled band cutting plate C⁶, a detail of which is shown in Fig. 7 of the drawings, said plate having a series of teeth C⁷ upon its lower edge.

E—E designate curved segment plates having serrations E' upon the convexed edges thereof, and each plate E is provided with an arm E² having apertures e therein, whereby said arms may be adjustably held upon a pin E³ for the purpose of holding the segment plates in adjusted positions.

Fixed to a cross beam F of the frame is a plate F', shown clearly in Fig. 5 of the drawings. Said plate has a clamping plate F² secured to the face thereof, and G designates an angled plate having a slot G' formed longitudinally therein, said slot being adapted to receive the clamping screw which holds the plate F² upon the beam F. F⁴ designates a rod having an eye F⁵ at its lower end, through which the shaft D passes. F⁶ is an arm having an eye F⁷ in its free end, through which the rod F⁴ has a play. A spring F⁸ is interposed between the arm F⁶ and the upper flange end of the plate G, and a pin G² is passed through an aperture in the upper end of the rod F⁴ for supporting the latter above said flanged end. A pin G⁶ projects from the rod F⁴ and is adapted to bear against the arm F⁶ to limit the upper movement of the rod F⁴ through the eye F⁷.

H designates a lever mounted upon a pivot pin H' carried by a plate H² and one end of the lever H is pivotally connected at H³ with the end of the arm F⁶, as shown in Fig. 5 of the drawings, and its other end pivotally connected at I' to a bar I, shown more clearly in Fig. 3 of the drawings. Pivoted to the side of the casing is a bar I², said bar I² having pivotal connection with the bar I, as shown in Fig. 3 of the drawings.

Mounted upon the crank shaft C is a beveled pinion J, shown clearly in Figs. 3 and 9 of the drawings, which wheel is in mesh with a beveled pinion J' fixed to the governor shaft J², which latter is journaled in suitable bearings in the bracket arms J³ and J⁴ secured to the frame of the machine. J⁵ is a collar loosely mounted upon the shaft J², and J⁶ are governor arms having connections with said collar J⁵ through the medium of the links J⁷. Upon reference to Fig. 3 of the drawings will be seen a lever K pivoted upon a pin K' projecting from the side of the casing. One end K² of the lever K is forked and engages a groove in the loosely mounted collar J⁵ in the manner shown in Figs. 3 and 9 of the drawings.

Fixed to the conveyer shaft a is a sleeve N having a clutch tooth Nˣ formed upon one end thereof, and N² designates a sleeve having wings N' projecting therefrom at positions diametrically opposite each other and said sleeve is notched as at N³ and adapted to engage a pin N⁴, shown in Fig. 11 of the drawings.

O designates a pulley which, in the drawings, is shown as grooved as at O' but, if preferred, it may be formed as a sprocket wheel and has a clutch tooth O² projecting from one face thereof, said clutch tooth O² being adapted to be normally held by means of a coiled spring O⁷ upon the shaft a in mesh with the clutch tooth Nˣ, whereby the wheel O, shaft A' and sleeve may rotate together.

Upon reference to Fig. 11 of the drawings, it will be noted that a nut O⁴ is mounted upon the threaded end of the shaft A' and forms means for regulating the tension of the spring O⁷.

O⁵ is a collar which is mounted upon the shaft A' and has a slight movement independent of the pulley O.

Q designates a rod fastened at one end to the hub O⁵ and its other end passes through an eye O⁶ formed in a lug projecting from the face of the pulley O. A coiled spring Q' is mounted upon the rod Q and bears between said lug upon the pulley O and the angled portion of the rod Q, the purpose of said spring Q' being to prevent any sudden jerking when the feeding apparatus is thrown into or out of gear. A crossed belt R passes about a pulley R³ upon the crank shaft and also about the clutch pulley O, whereby a continuous rotary movement may be imparted to the pulley O.

Referring to Figs. 14 and 15 of the drawings will be seen means for holding the conveyer shaft taut, in which a bearing block S is shown in which a conveyer shaft is mounted, and S' designates a pin projecting from the boxing S and about which a coiled spring S² is mounted, said spring serving to hold the conveyer chain taut.

In operation, the shaft C being given a continuous rotary movement, the segment plates E, which are connected therewith, will be given the usual movement which will cause the grain to be fed forward to the cylinder as it is fed forward by the conveyer. When the speed of the apparatus is normal, the governor arms are thrown by centrifugal force outward which will cause the lever K to tilt upon its pivot, so that its free end will be out of the path of the wings of the sleeve N², allowing the endless conveyer to move freely. In the event of the straw being fed by the conveyer bunching up underneath the two segment plates, the latter will be forced upward moving the shaft D vertically. This vertical movement will cause the lever H to tilt upon its pivot and the bar I will be thrown down so that the end of the bar I², pivotally connected therewith, will be positioned in the path of the wings N' of the sleeve N² in the position shown in Fig. 3 of the drawings and, in which position, the wings will contact with the end of the bar I² and cause the sleeve and the shaft to which it is fixed to stop, thereby ceasing the feeding forward of the grain upon the conveyer temporarily. As the wings of the sleeve contact with the end of the bar I², the endless belt or chain R will continue to drive the pulley O with which it is in contact, said pulley O being loosely mounted upon the shaft $a$. Owing to the clutch connection between the pulley O and the sleeve N², it will be noted that the pulley O will be thrown out of connection with the sleeve as the end of the clutch O² strikes the inclined end of the clutch tooth N^x and will turn freely upon the shaft $a$ which is idle. As soon as the bunching of the straw underneath the segment plates has been cut down by the action of said segment plates, the spring F⁸, aided by gravity, will cause the shaft D to be moved back to its normal position and, by which movement, the lever H will tilt back and draw the bar I² out of the path of the wings of the sleeve and the spring O³ will throw the pulley O with the clutch tooth thereon in mesh with the tooth on the sleeve, thereby causing the conveyer to start feeding again. Any sudden jar incident to the stopping and starting of the conveyer shaft is avoided by means of the spring Q', shown in Fig. 11, which allows the pulley O to have a slight movement independent of the hub O⁵.

In the event of any slowing down of the shaft A' on which the cylinder (not shown) is designed to be mounted, the governor arms will fall and the lever K will tilt upon its pivot throwing its free end in the path of the wings of said sleeve, which will also cause the driving shaft A' to stop. It will thus be noted that the feeding of the straw may be checked in two different parts and from two different causes, one being the clogging up of the straw underneath the segments and the other the slackening of the movement of the threshing cylinder.

By the provision of a feeding apparatus for threshing machines as shown and described, an efficient apparatus is afforded whereby the feeding of the straw may be uniform, thereby allowing the grain to be thoroughly threshed.

What I claim to be new is:—

1. A feeding apparatus for threshing machines comprising, in combination with a casing, a crank shaft, a series of segment feeding plates pivotally connected to said crank shaft, a series of bars pivotally connected to said crank shaft, segment plates upon said bars, a horizontally disposed and vertically movable shaft loosely held in bearings in the frame of the casing, links fixed to said horizontally disposed shaft and having pivotal connection with said bars, a bracket plate mounted upon the frame, a rod supported by said bracket arm and having an eye through which said horizontally disposed shaft passes, a pivoted lever, an arm projecting through said slot and having an eye through which said rod passes, a conveyer shaft, a winged sleeve fixed thereto and having a clutch tooth, a spring-pressed clutch pulley loosely mounted upon the conveyer shaft, belted connections between said clutch pulley and crank shaft, and means actuated by said pivoted lever for causing the winged sleeve and shaft to which it is fastened to stop while the crank shaft rotates, as set forth.

2. A feeding apparatus for threshing machines comprising, in combination with a casing, a crank shaft, a series of segment feeding plates pivotally connected to said crank shaft, a series of bars pivotally connected to said crank shaft, segment plates upon said bars, a horizontally disposed and vertically movable shaft loosely held in bearings in the frame of the casing, links fixed to said horizontally disposed shaft and having pivotal connection with said bars, a bracket plate mounted upon the frame, a rod supported by said bracket arm and having an eye through which said horizontally disposed shaft passes, a pivoted lever, an arm projecting through said slot and having an eye through which said rod passes, a conveyer shaft, a winged sleeve fixed thereto and having a clutch tooth, a spring-pressed clutch pulley loosely mounted upon the conveyer shaft, belted connections between said clutch pulley and crank shaft, a pivotal bar mounted upon the frame, and connections between said pivotal bar and lever, as set forth.

3. A feeding apparatus for threshing machines comprising, in combination with a casing, a crank shaft, a series of segment feeding plates pivotally connected to the latter, a series of bars pivotally connected to the crank shaft, segment plates upon said bars, a horizontally disposed and vertically movable shaft loosely held in bearings in the frame of the casing, links fixed to said horizontally disposed shaft and having pivotal connection with said bars, an adjustable bracket plate mounted upon the frame, rods supported by said bracket arm and having an eye through which the horizontally disposed shaft passes, a pivoted lever, an arm projecting through said slot and having an eye through which the rod passes, a conveyer shaft, a winged sleeve fixed thereto and having a clutch tooth upon one face thereof, a spring-pressed clutch pulley loosely mounted upon the conveyer shaft, a belted connection between said clutch pulley and crank, a pivotal bar mounted upon the frame, and connections between said bar and lever, as set forth.

4. A feeding apparatus for threshing machines comprising, in combination with a casing, a crank shaft, a series of segment feeding plates pivotally connected to the latter, a series of bars pivotally connected to the crank shaft, segment plates upon said bar, a horizontally disposed and vertically movable shaft loosely held in bearings in the frame of the casing, links fixed to said horizontally disposed shaft and having pivotal connection with said bars, an angled slotted plate, a clamping plate holding the slotted end of said angled plate in an adjusted position, a rod passing through an aperture in the bracket plate, a pin passing through said rod and supporting the rod, the latter being provided with an eye at its lower end through which said horizontally disposed shaft passes, a pivoted lever, an arm projecting through said slot and having an eye through which said rod passes, a pin projecting from said rod and upon which said arm rests, a conveyer shaft, a winged sleeve fixed thereto and having a clutch tooth, a spring-pressed clutch pulley loosely mounted upon the conveyer shaft, a belted connection between said clutch pulley and crank shaft, a pivotal bar mounted upon the frame, and connections between said pivotal bar and lever, as set forth.

In testimony whereof I hereunto affix my signature in the presence of two witnesses.

HENRY H. BOCKELMAN.

Witnesses:
   JULIUS CULLENS,
   MATTIE BAYNE.